(12) United States Patent
Dixon

(10) Patent No.: US 12,240,213 B2
(45) Date of Patent: Mar. 4, 2025

(54) LAMINATED GLAZING

(71) Applicant: Pilkington Group Limited, Nr. Ormskirk (GB)

(72) Inventor: Jonathan Barclay Dixon, Ormskirk (GB)

(73) Assignee: Pilkington Group Limited, Nr. Ormskirk (GB)

( * ) Notice: Subject to any disclaimer, the term of this patent is extended or adjusted under 35 U.S.C. 154(b) by 431 days.

(21) Appl. No.: 17/760,562

(22) PCT Filed: Sep. 17, 2020

(86) PCT No.: PCT/GB2020/052240
§ 371 (c)(1),
(2) Date: Mar. 15, 2022

(87) PCT Pub. No.: WO2021/053335
PCT Pub. Date: Mar. 25, 2021

(65) Prior Publication Data
US 2022/0339903 A1    Oct. 27, 2022

(30) Foreign Application Priority Data
Sep. 18, 2019 (GB) ........................ 1913460

(51) Int. Cl.
| | | |
|---|---|---|
| B32B 3/08 | (2006.01) | |
| B32B 7/023 | (2019.01) | |
| B32B 17/10 | (2006.01) | |
| B32B 27/08 | (2006.01) | |
| B60Q 3/208 | (2017.01) | |
| B60Q 3/80 | (2017.01) | |

(52) U.S. Cl.
CPC ................ *B32B 3/08* (2013.01); *B32B 7/023* (2019.01); *B32B 17/10036* (2013.01);
(Continued)

(58) Field of Classification Search
CPC ........ F21S 43/26; F21S 43/14; B60Q 1/0088; B60Q 1/22; B60Q 1/44; B60Q 1/302;
(Continued)

(56) References Cited

U.S. PATENT DOCUMENTS

| | | |
|---|---|---|
| 7,745,838 B2 | 6/2010 | Lefevre |
| 2006/0275599 A1 | 12/2006 | Lefevre |

(Continued)

FOREIGN PATENT DOCUMENTS

| | | |
|---|---|---|
| CN | 107660181 A | 2/2018 |
| CN | 107848269 A | 3/2018 |

(Continued)

OTHER PUBLICATIONS

International Search Report (PCT/ISA/210) and Written Opinion (PCT/ISA/237) mailed on Dec. 1, 2020, by the European Patent Office as the International Searching Authority for International Application No. PCT/GB2020/052240. (10 pages).
(Continued)

*Primary Examiner* — Joseph L Williams
(74) *Attorney, Agent, or Firm* — BUCHANAN INGERSOLL & ROONEY PC

(57) ABSTRACT

A laminated glazing pane is described comprising first and second sheets of glazing material joined by an interlayer structure comprising at least one sheet of adhesive interlayer material. Each sheet of glazing material has respective first and second major surfaces and the laminated glazing is arranged such that the second major surface of the first sheet of glazing material faces the first major surface of the second sheet of glazing material. An illumination device is arranged relative to the first sheet of glazing material to emit light towards the second major surface of the first sheet of glazing material. The first and/or second major surface of the first sheet of glazing material has an array of dots thereon for
(Continued)

diffusing light emitted by the illumination device that is transmitted through the first sheet of glazing material and out from the first major surface thereof.

20 Claims, 5 Drawing Sheets

(52) U.S. Cl.
CPC .. *B32B 17/10348* (2013.01); *B32B 17/10357* (2013.01); *B32B 17/10761* (2013.01); *B32B 17/1077* (2013.01); *B32B 17/10788* (2013.01); *B32B 2250/03* (2013.01); *B32B 2250/05* (2013.01); *B32B 2250/40* (2013.01); *B32B 2255/10* (2013.01); *B32B 2307/412* (2013.01); *B32B 2307/414* (2013.01); *B32B 2307/42* (2013.01); *B32B 2307/732* (2013.01); *B32B 2605/00* (2013.01); *B60Q 3/208* (2017.02); *B60Q 3/80* (2017.02)

(58) Field of Classification Search
CPC ... B60Q 1/2696; B32B 3/08; B32B 17/10036; B32B 27/08; B32B 27/306
See application file for complete search history.

(56) References Cited

U.S. PATENT DOCUMENTS

| | | | | |
|---|---|---|---|---|
| 2008/0115428 | A1* | 5/2008 | Schlam | E06B 9/24 52/173.1 |
| 2013/0039059 | A1* | 2/2013 | Montgermont | E06B 3/66 362/235 |
| 2017/0041987 | A1 | 2/2017 | Weber et al. | |
| 2017/0327031 | A1 | 11/2017 | Bauerle | |
| 2018/0187858 | A1* | 7/2018 | Serrano | F21S 43/26 |
| 2019/0134954 | A1 | 5/2019 | Bauerle et al. | |
| 2019/0193376 | A1 | 6/2019 | Bauerle | |
| 2019/0291388 | A1 | 9/2019 | Bauerle | |

FOREIGN PATENT DOCUMENTS

| | | |
|---|---|---|
| CN | 107848379 A | 3/2018 |
| DE | 102013003686 A1 | 9/2014 |
| JP | 2017521337 A | 8/2017 |
| WO | 2004009349 A1 | 1/2004 |
| WO | 2004062908 A2 | 7/2004 |
| WO | 2010097110 A1 | 9/2010 |
| WO | 2017066675 A1 | 4/2017 |
| WO | 2019048712 A1 | 3/2019 |

OTHER PUBLICATIONS

Search Report under Section 17(5) mailed on Mar. 16, 2020 issued by the United Kingdom Intellectual Property Office in corresponding GB Application No. 1913460.0. (3 pages).

Office Action (Notice of Reasons for Refusal) issued on Apr. 23, 2024, in corresponding Japanese Patent Application No. 2022-517705 and English translation of the Office Action. (6 pages).

Office Action/Search Report (Notification of the First Office Action) issued on Feb. 4, 2023, in corresponding Chinese Patent Application No. 202080065660.1 and English translation of the Office Action/ Search Report. (13 pages).

* cited by examiner

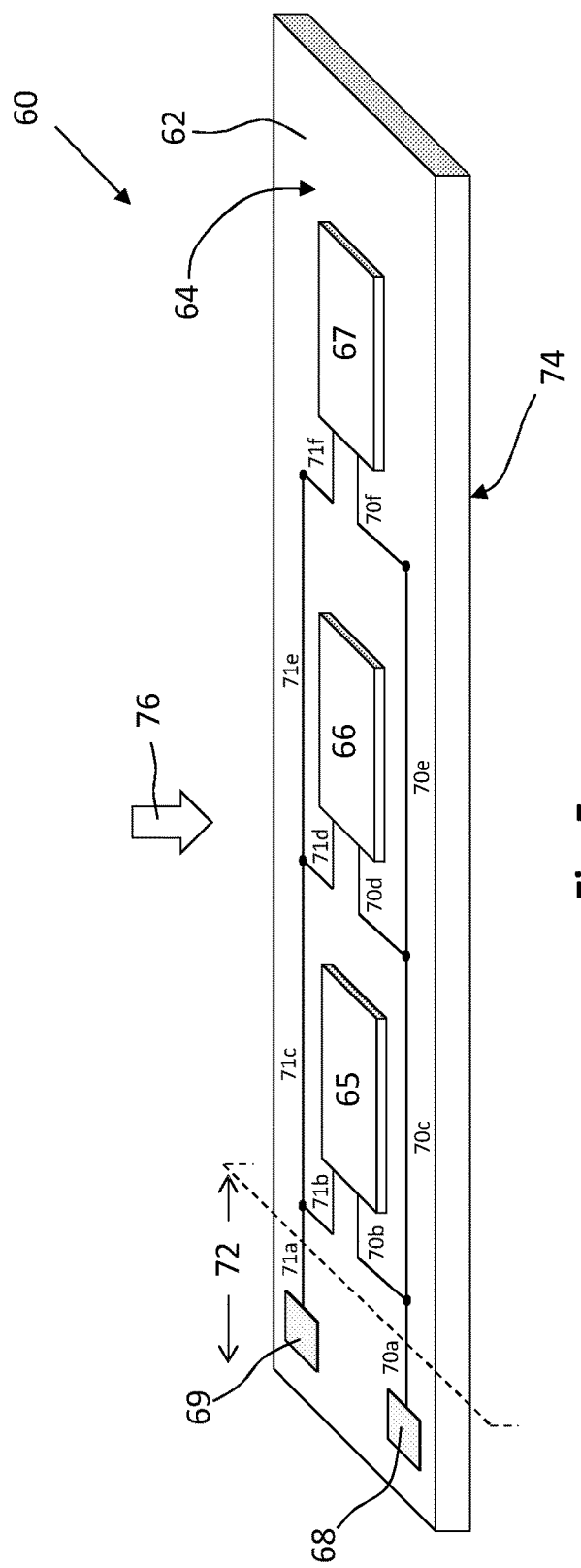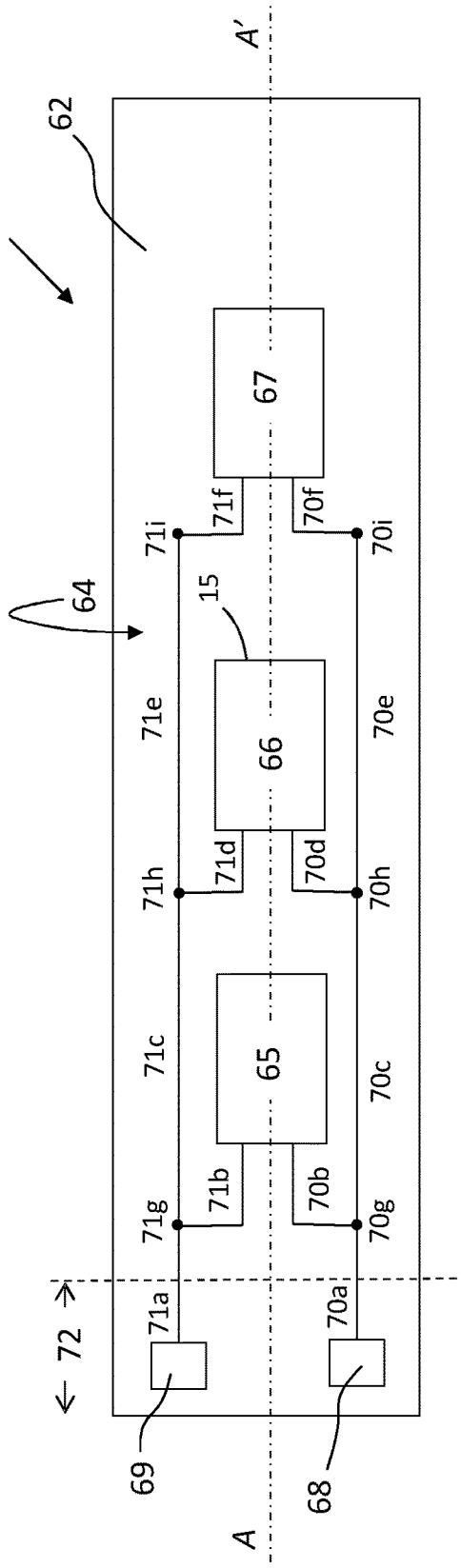
Fig. 5
Fig. 6

LAMINATED GLAZING

The present invention relates to a laminated glazing pane comprising an illumination device.

It is known to incorporate light emitting diodes in between two glass sheets of a laminated glazing. It is known to attach the light emitting diodes to an electrically conductive coating provided on one of the glass sheets, as in WO2004/062908A2.

It is also known to mount a light emitting diode on a circuit board and to laminate the circuit board between two glass plies (or sheets) as in WO2004/009349A1. The circuit board described in WO2004/009349A1 includes a flexible circuit comprising a substrate and a conductive layer. The substrate may comprise polyester and the conductive layer may be a conductive ink which is in direct contact with the substrate.

However, when incorporating light emitting diodes in such a glazing, the point source nature of the light emitting diode is often visually distracting and may not provide uniform illumination.

The present invention aims to at least partially provide a solution to this problem.

Accordingly the present invention provides a laminated glazing pane comprising: a first sheet of glazing material having a first major surface and a second opposing major surface, a second sheet of glazing material having a first major surface and a second opposing major surface, an interlayer structure for joining the first sheet of glazing material to the second sheet of glazing material, the interlayer structure comprising at least one sheet of adhesive interlayer material, and an illumination device comprising one or more light source, wherein the laminated glazing is arranged such that the interlayer structure is between the first and second sheets of glazing material; the second major surface of the first sheet of glazing material faces the first major surface of the second sheet of glazing material; and the illumination device is arranged relative to the first sheet of glazing material to emit light towards the second major surface of the first sheet of glazing material; wherein the first and/or second major surface of the first sheet of glazing material has an array of dots thereon for diffusing light emitted by the illumination device that is transmitted through the first sheet of glazing material and out from the first major surface thereof.

The array of dots block some of the light that is emitted by the illumination device but the size of each dot and the spacing thereof in the array of dots is selected to provide a diffusing function to light emitted by the one or more light source. This is particularly useful when the one or more light source of the illumination device comprises a light emitting diode. Light emitted by the light emitting diode is diffused after passing through the array of dots thereby reducing the point source like nature of the light emitting diode.

Preferably at least one of the one or more light sources of the illumination device is located between the first and second sheets of glazing material, more preferably all of the one or more light sources of the illumination device are located between the first and second sheets of glazing material.

Preferably at least a portion of the illumination device is located between the first and second sheets of glazing material.

The array of dots is over a first portion of the first or second major surface of the first sheet of glazing material, and preferably the first portion is aligned with one of the one or more light source.

Each dot in the array of dots has an outer periphery, and it is preferred that the outer periphery of at least one of the dots in the array of dots is circular, ellipsoidal, triangular, a quadrilateral (i.e. square, rectangular or trapezoidal) or has more than four sides.

Preferably two or more of the dots in the array of dots are the same size.

Preferably at least one of the dots covers an area of the first or second major surface of the first sheet of glazing material of between 0.01 and 5 mm$^2$.

Each dot has a closest dot and the spacing of a dot and the closest dot is preferably at least 0.5 mm, more preferably between 0.5 mm and 5 mm.

Preferably at least one of the dots in the array of dots is black or white in colour.

Preferably the array of dots is only on the first major surface of the first sheet of glazing material or only on the second major surface of the first sheet of glazing material.

Preferably the array of dots is at least partially surrounded by an optically opaque region, the optically opaque region preventing light from being transmitted through the laminated glazing pane. It is preferred that the optically opaque region fully surrounds the optically opaque region. Preferably the optically opaque region is a printed region on the first and/or second major surface of the first sheet of glazing material.

Preferably the laminated glazing is curved in at least one direction. Preferably the radius of curvature in the at least one direction is between 500 mm and 20000 mm, more preferably between 1000 mm and 8000 mm.

Preferably the first and/or second sheet of glazing material comprises glass, more preferably soda-lime-silica glass. A typical soda-lime-silica glass composition is (by weight), $SiO_2$ 69-74%; $Al_2O_3$ 0-3%; $Na_2O$ 10-16%; $K_2O$ 0-5%; MgO 0-6%; CaO 5-14%; $SO_3$ 0-2%; $Fe_2O_3$ 0.005-2%. The glass composition may also contain other additives, for example, refining aids, which would normally be present in an amount of up to 2%.

Preferably the first sheet of adhesive interlayer material is tinted and/or translucent.

Preferably the first sheet of adhesive interlayer material has a thickness between 0.2 mm and 2 mm.

Preferably the first sheet of adhesive interlayer material comprises polyvinyl butyral, a copolymer of ethylene, such as ethylene vinyl acetate (EVA), polyurethane, in particular a thermoplastic polyurethane, or an ionoplast interlayer material.

Preferably at least one of the one or more light source is a light emitting diode.

Preferably the laminated glazing is part of an automotive glazing, such as a windscreen, side window, rear window or roof window i.e. a sunroof.

In some embodiments the laminated glazing pane comprises an infrared radiation reflecting film. The infrared radiation reflecting film may be on the first or second sheet of glazing material or may be on a sheet forming part of the interlayer structure.

Preferably the infrared radiation reflecting film comprises at least one layer comprising a metal, in particular silver.

Preferably the infrared radiation reflecting film comprises one or more metallic layers (or metal oxide layers) and one or more dielectric layers, typically forming a multilayer stack. The multilayer stack structure may be repeated to enhance the reflectivity of the film. Amongst other similar metals, silver, gold, copper, nickel and chromium may be used as the metallic layer in a multilayer stack; indium oxide, antimony oxide or the like may be used as the metal oxide layer. Films comprising one or two layers of silver interleaved between layers of a dielectric such as an oxide of silicon, aluminium, titanium, vanadium, tin or zinc are typical multilayer stacks. Generally, the one or more layers from which the infrared reflective film is formed are of the order of tens of nanometres in thickness.

As an alternative to the (metal/dielectric)n based film described above, the infrared radiation reflecting film may include a plurality of non-metallic layers, such that it functions as a band filter (the band being focussed on the near infrared region of the electromagnetic spectrum).

In some embodiments the interlayer structure comprises a second sheet of adhesive interlayer material and the illumination device is between the first and second sheets of adhesive interlayer material.

Preferably the second sheet of adhesive interlayer material has a thickness between 0.2 mm and 2 mm.

Preferably the second sheet of adhesive interlayer material comprises polyvinyl butyral, a copolymer of ethylene, such as ethylene vinyl acetate (EVA), polyurethane, in particular a thermoplastic polyurethane, or an ionoplast interlayer material.

In some embodiments the illumination device is mounted to the second major surface of the first sheet of glazing material, and the second major surface of the first sheet of glazing material comprises at least one electrically conductive pathway thereon for providing electrical power to the illumination device. By providing electrical power to the illumination device at least one of the one or more light source becomes operable to emit light therefrom.

Preferably the at least one electrically conductive pathway is an electrically conductive coating.

Preferably the electrically conductive coating is optically transparent

Preferably the electrically conductive coating is optically opaque.

In some embodiments the illumination device is mounted to the first major surface of the second sheet of glazing material, and the first major surface of the second sheet of glazing material comprises at least one electrically conductive pathway thereon for providing electrical power to the illumination device. By providing electrical power to the illumination device at least one of the one or more light source becomes operable to emit light therefrom.

Preferably the at least one electrically conductive pathway is an electrically conductive coating.

Preferably the electrically conductive coating is optically transparent

Preferably the electrically conductive coating is optically opaque.

In some embodiments the illumination device comprises a circuit board and at least one of the one or more light source is mounted on the circuit board, and the circuit board is mounted on the second major surface of the first sheet of glazing material, or the circuit board is mounted on the first major surface of the second sheet of glazing material.

The circuit board has at least one electrically conductive pathway thereon for providing electrical power to the illumination device. By providing electrical power to the illumination device at least one of the one or more light source becomes operable to emit light therefrom.

Preferably the circuit board is optically transparent. The optical wavelength region is between 380 nm and 780 nm.

Preferably the at least one electrically conductive pathway is an electrically conductive coating.

Preferably the electrically conductive coating is optically transparent

Preferably the electrically conductive coating is optically opaque.

Preferably the circuit board comprises a plastic material.

Preferably the circuit board comprises a polyester.

Preferably the substrate comprises polyethylene terephthalate (PET) or polycarbonate.

Preferably the interlayer structure comprises a second sheet of adhesive interlayer material and the circuit board is between the first and second sheets of adhesive interlayer material.

In embodiments where the interlayer structure comprises a second sheet of adhesive interlayer material, preferably the second sheet of adhesive interlayer material is tinted and/or translucent. Preferably the second sheet of adhesive interlayer material comprises polyvinyl butyral, a copolymer of ethylene, such as ethylene vinyl acetate (EVA), polyurethane, in particular a thermoplastic polyurethane, or an ionoplast interlayer material.

In some embodiments the array of dots is over a first portion of the first or second major surface of the first sheet of glazing material, and the first portion of the first or second major surface of the first sheet of glazing material is aligned with one of the one or more light source.

In some embodiments the dots in the array of dots are uniformly spaced.

In some embodiments the laminated glazing pane comprises at least two (a first and a second) arrays of dots, the first array of dots being arranged to diffuse light emitted from a first light source and the second array of dots being arranged to diffuse light emitted from a second light source, the first and second light sources being part of the illumination device.

In some embodiments the laminated glazing pane is part of a vehicle glazing, in particular a sunroof, side window, rear window or windscreen.

The invention will now be described with reference to the following figures (not to scale) in which, FIG. 1 shows a schematic cross-sectional view of a laminated glazing pane in accordance with the present invention;

FIG. 5 shows a schematic isometric view of an illumination device for use with the present invention;

FIG. 6 shows a schematic plan view of the illumination device shown in FIG. 5;

FIG. 2 is an exploded cross-sectional view of the laminated glazing pane 1 to aid with the description thereof.

Figure 1:
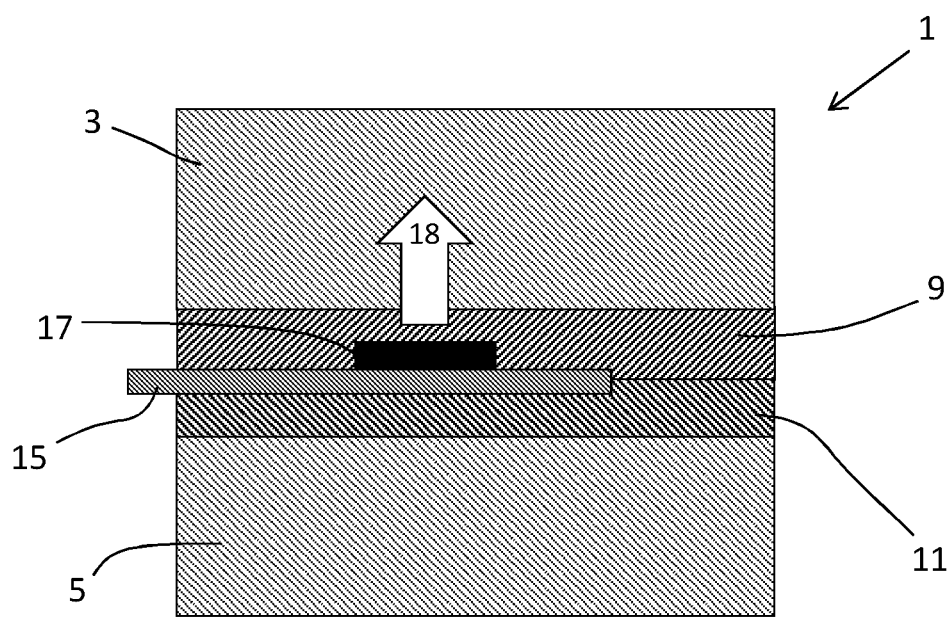
FIG. 1 shows a schematic cross-sectional view of a laminated glazing pane 1 in accordance with the present invention.

The laminated glazing pane 1 comprising a first sheet of glass 3 joined to a second sheet of glass 5 by means of first and second sheets of polyvinyl butyral (PVB) 9, 11. Each of the sheets of PVB 9, 11 are between 0.2 mm and 2 mm thick.

Between the first and second sheets of PVB 9, 11 is an illumination device 13 comprising a circuit board 15 having a first major surface 15a and second opposing major surface 15b. The circuit board 15 is an optically transparent sheet of polyethylene terephthalate (PET) having a thickness of 0.1 mm-0.2 mm and has electrically conductive pathways thereon.

The first sheet of glass 3 is a soda-lime-silica glass and has a first major surface 3a and a second opposing major surface 3b.

A light emitting diode 17 is mounted on the first major surface 15a of the circuit board 15. The light emitting diode 17 has a first electrical input and a second electrical input such that upon bringing the first electrical input of the light emitting diode 17 into electrical communication with a first output terminal of a suitable electrical power supply, and bringing the second electrical input of the light emitting diode 17 into electrical communication with a second output terminal of the suitable power supply, electrical power is provided to the light emitting diode to switch the light emitting diode 17 "on" i.e. the light emitting diode goes from an unenergized state wherein no light is emitted by the light emitting diode to an energised state wherein light is emitted by the light emitting diode. In the energised state light is emitted in the direction of arrow 18 towards the second major surface 3b of the first sheet of glass to be transmitted through the first major surface 3a.

Electrically conductive pathways (not shown) are on the first major surface 15a and are in electrical communication with the electrical inputs of the light emitting diode 17 for providing electrical power thereto. Suitably the electrically conductive pathways are an electrically conductive ink applied to the first major surface 15a by means of a printing process, such as screen printing or inkjet printing such that the electrically conductive pathways are in direct contact with the first major surface 15a of the substrate 15. The circuit board extends beyond the periphery of the laminated glazing pane 1 to allow connection to a suitable power supply.

In accordance with the present invention, a region 7 of the second major surface 3b of the first sheet of glass 3 has an array of dots printed thereon. The dots in the array of dots are solid black dots having an approximately circular outer periphery. The dots are different sizes may be all the same size. The dots are optically opaque and are a printed dot of the same type used to provide a vehicle glazing with a fade out region of an obscuration band.

The array of dots in the region 7 diffuse the light emitted by the light emitting diode 17.

Figure 3:
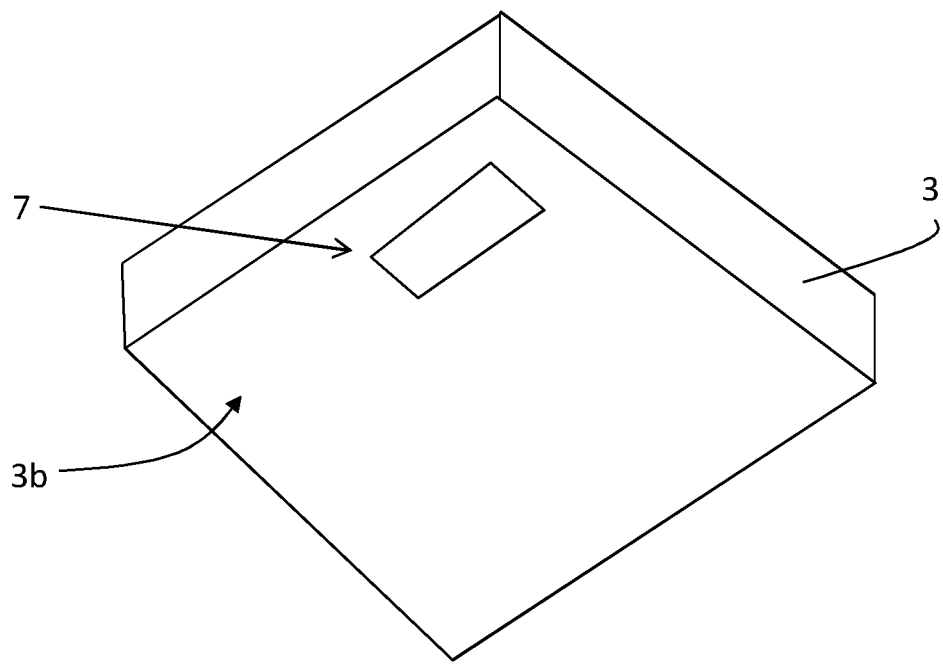
FIG. 3 shows a schematic isometric view of a sheet of glass with an array of dots on a major surface thereof used to the make the laminated glazing pane shown in FIG. 1.

FIG. 3 shows a schematic isometric representation of the first sheet of glass 3 looking towards the second major surface 3b. The region 7 is shown schematically as having a rectangular outline, but may have other configurations.

Figure 4:
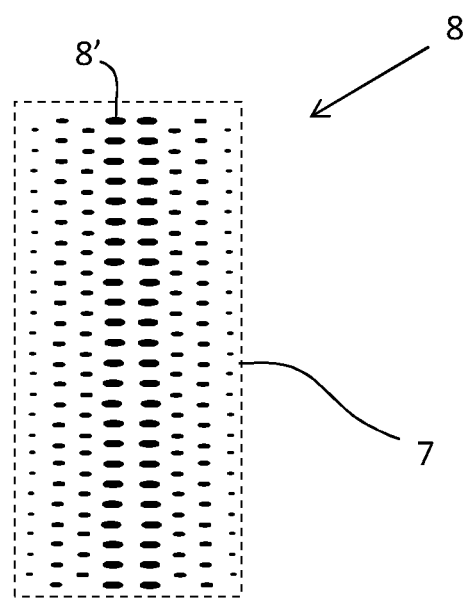
FIG. 4 is a schematic view of an array of dots.

FIG. 4 shows the individual dots 8' (only one is labelled) in the array of dots 8 in the region 7. The region 7 is shown as a dotted line to indicate the outer periphery thereof.

Figure 2:
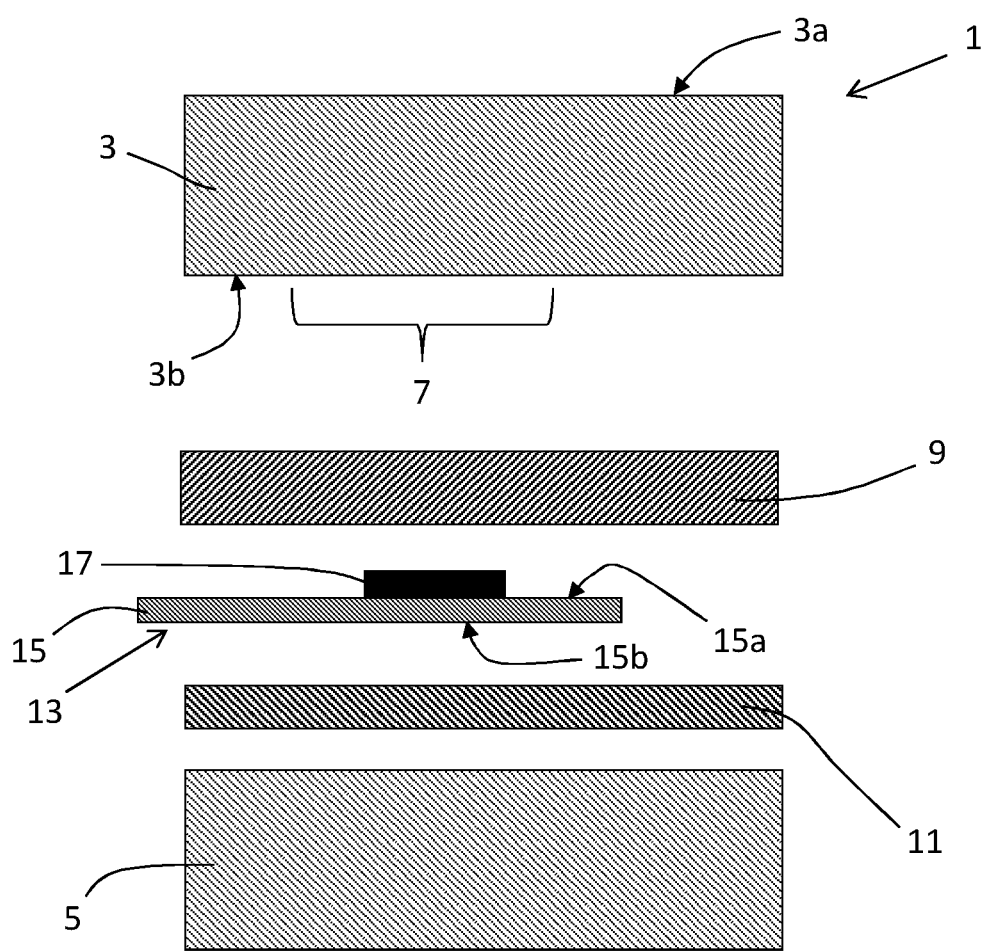
FIG. 2 shows a schematic exploded cross-sectional view of the laminated glazing pane shown in FIG. 1.

FIG. 5 shows a schematic isometric representation of an illumination device 60 similar to the illumination device 13 described in relation to FIGS. 1 and 2, the main difference being that the illumination device 60 has three light emitting diodes, and not one, mounted on a circuit board.

The illumination device 60 comprises a substrate 62 having a first major surface 64 and an opposing second major surface 74. The substrate 62 is a single sheet of PET which may suitably be cut from a larger sheet of PET as required. The substrate 62 would typically be referred to as monolithic.

Mounted on the first major surface 64 of the substrate 62 are three light emitting diodes 65, 66 and 67. Each light emitting diode may emit light of the same colour i.e. the same wavelengths, or two or more may emit different colour light. At least one of the light emitting diodes 65, 66 and 67 may emit an infrared beam, for example at a wavelength of about 800 nm.

Each light emitting diode 65, 66, 67 has a respective pair of electrical inputs (a first electrical input and a second electrical input) for providing electrical power to the respective light emitting diode as previously described.

Also, on the first major surface 64 is a pair of electrical contacts, a first electrical contact 68 and a second electrical contact 69. The first electrical contact 68 and the second electrical contact 69 may be suitably screen printed using an electrically conductive ink.

The first electrical contact 68 is in electrical communication with the first electrical input of each of the light emitting diodes 65, 66 and 67 via electrically conductive tracks 70a, 70b, 70c, 70d, 70e and 70f.

The second electrical contact 69 is in electrical communication with the second electrical input of each of the light emitting diodes 65, 66 and 67 via electrically conductive tracks 71a, 71b, 71c, 71d, 71e and 71f.

As is evident from FIGS. 5 and 6, the three light emitting diodes 65, 66, 67 are electrically connected in parallel with the pair of electrical contacts 68, 69.

If desired, one or more of the light emitting diodes 65, 66, 67 may be electrically connected in series with the pair of electrical contacts 68, 69.

The pair of electrical contacts 68, 69 are on an end portion 72 of the substrate 62. When the electrical device 60 is incorporated into a laminated glazing, for example of the type shown in FIG. 1, the end portion 72 is not located between the first and second sheets of PVB 9, 11 or the first and second sheets of glass 3, 5 so that a suitable power supply may be electrically connected to the pair of electrical contacts 68, 69 to provide electrical power to the light emitting diodes 65, 66, 67.

The substrate 62 with the electrically conductive pathways thereon functions as a circuit board.

FIG. 6 is a plan view of the illumination device 60 i.e. when viewed in the direction of arrow 76 shown in FIG. 5.

As shown in FIG. 6, the electrically conductive pathway 70a is in electrical communication at one end with the first electrical contact 68 and at the other end with electrically conductive node 70g.

The electrically conductive pathway 70b is in electrical communication at one end with the first electrical input of the light emitting diode 65 and at the other end with electrically conductive node 70g.

The electrically conductive pathway 70c is in electrical communication at one end with the electrically conductive node 70g and at the other end with electrically conductive node 70h.

The electrically conductive pathway 70d is in electrical communication at one end with the first electrical input of the light emitting diode 66 and at the other end with electrically conductive node 70h.

The electrically conductive pathway 70e is in electrical communication at one end with electrically conductive node 70h and at the other end with electrically conductive node 70i.

The electrically conductive pathway 70f is in electrical communication at one end with the first electrical input of the light emitting diode 67 and at the other end with electrically conductive node 70i.

The electrically conductive pathway 71a is in electrical communication at one end with the second electrical contact 69 and at the other end with electrically conductive node 71g.

The electrically conductive pathway 71b is in electrical communication at one end with the second electrical input of the light emitting diode 65 and at the other end with electrically conductive node 71g.

The electrically conductive pathway 71c is in electrical communication at one end with the electrically conductive node 71g and at the other end with electrically conductive node 71h.

The electrically conductive pathway 71d is in electrical communication at one end with the second electrical input of the light emitting diode 66 and at the other end with electrically conductive node 71h.

The electrically conductive pathway 71e is in electrical communication at one end with the electrically conductive node 71h and at the other end with electrically conductive node 71i.

The electrically conductive pathway 71f is in electrical communication at one end with the second electrical input of the light emitting diode 67 and at the other end with electrically conductive node 71i.

The electrically conductive pathways 70a, 70b, 70c, 70d, 70e, 70f, 71a, 71b, 71c, 71d, 71e and 71f and the electrically conductive nodes 70g, 70h, 70i, 71g, 71h, 71i are all in direct contact with the first major surface 64 of the substrate 62. It is also preferred that the first electrical contact 68 and the second electrical contact 69 are in direct contact with the first major surface 64 of the substrate 62.

The electrically conductive pathways 70a, 70b, 70c, 70d, 70e, 70f, 71a, 71b, 71c, 71d, 71e and 71f and the electrically conductive nodes 70g, 70h, 70i, 71g, 71h, 71i may all be printed in the same printing operation with the same electrically conductive ink.

The first electrical contact 68 and the second electrical contact 69 may be suitably screen printed using the same electrically conductive ink as used to screen print the electrically conductive pathways and/or electrically conductive nodes. It is also preferred that the first electrical contact 68 and the second electrical contact 69 are printed in the same printing operation used to print the electrically conductive pathways and/or electrically conductive nodes.

In an alternative to the embodiment shown in FIGS. 5 and 6, there are no electrically conductive nodes, but the electrically conductive tracks are still in electrical communication as described above.

Figure 7:
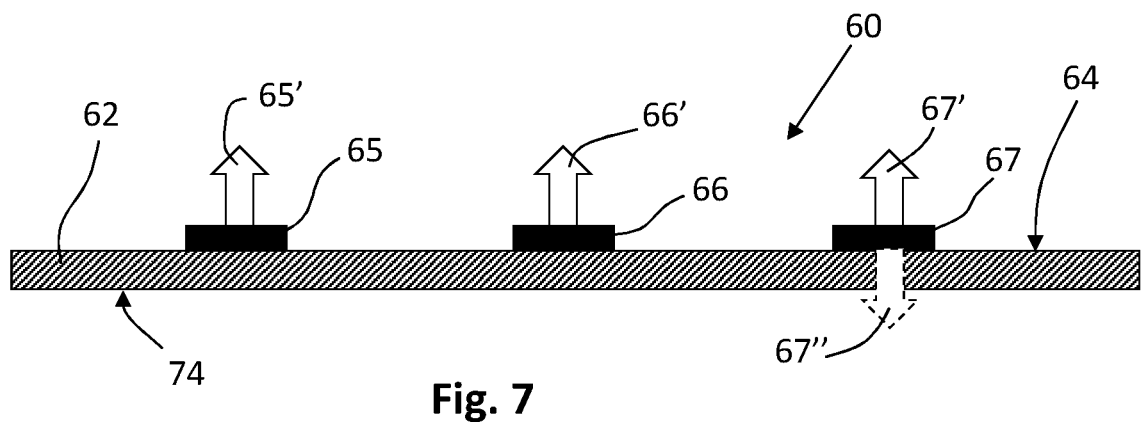
FIG. 7 shows a schematic cross-sectional view of the illumination device shown in FIGS. 5 and 6.

FIG. 7 is a schematic cross-sectional view of the illumination device 60 viewed along the line A-A' of FIG. 6.

The light emitting diode 65 is arranged to emit a beam of light in the direction of arrow 65'. The light emitting diode 66 is arranged to emit a beam of light in the direction of arrow 66'. The light emitting diode 67 is arranged to emit a beam of light in the direction of arrow 67'.

Any or all of the light emitting diodes 65, 66, 67 may be arranged to emit a beam of light in the opposite direction. This is illustrated for light emitting diode 67 showing (in phantom) a beam of light in the direction of arrow 67" i.e. passing through the thickness of the substrate 62 and the infrared reflecting film 74.

Figure 8:
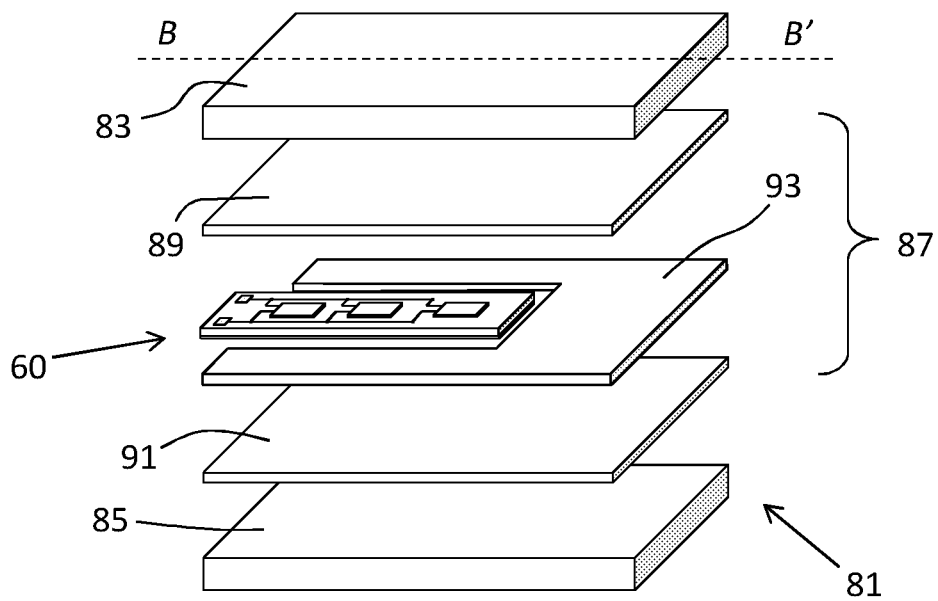
FIG. 8 shows a schematic isometric exploded view of a laminated glazing pane in accordance with the present invention.
Figure 9:
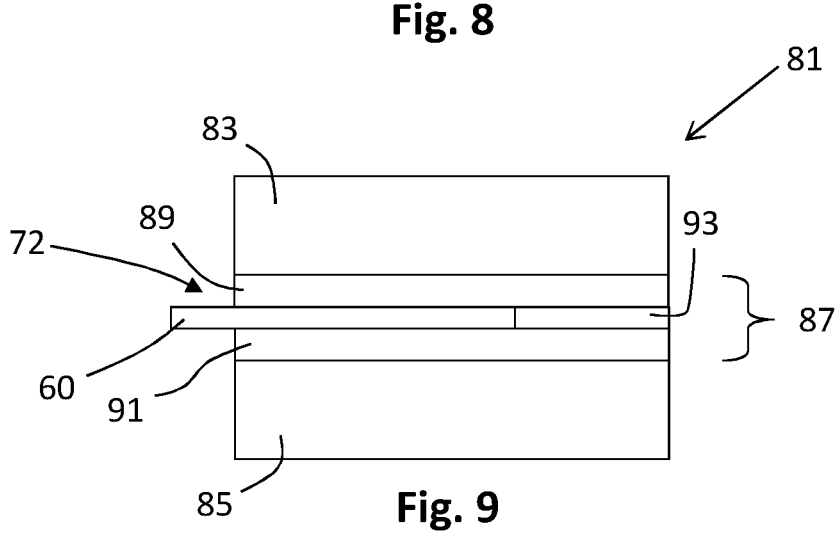
FIG. 9 shows a schematic cross-sectional view of the laminated glazing pane shown in FIG. 8.

Although only three light emitting diodes are shown in FIGS. 7-9, there may be more than three light emitting diodes or there may be only one or two light emitting diodes mounted on the first major surface 64 of the substrate 62.

FIG. 8 shows a schematic exploded perspective view of another laminated glazing pane 81. FIG. 9 shows a schematic cross-sectional view of the laminated glazing pane 81 of FIG. 8 through the line B-B'.

In this example the laminated glazing pane 81 comprises a first sheet of glass 83 joined to a second sheet of glass 85 by means of an interlayer structure 87. The interlayer structure 87 consists of three sheets of adhesive interlayer material (i.e. PVB, EVA or combinations of plies thereof) 89, 91 and 93. The first sheet of adhesive interlayer material 89 is coextensive with the first sheet of glass. The second sheet of adhesive interlayer material 91 is coextensive with the second sheet of glass 85. The third sheet of adhesive interlayer material 93 is located between the first and second sheets of interlayer material 89, 91 and has a cut-out region therein to accommodate the illumination device 60. The cut-out region is along one edge of the third sheet of adhesive interlayer material and the other three edges thereof are aligned with the respective edges of the first and second sheets of adhesive interlayer material.

FIG. 8 is representation of the stack of unlaminated components that may be laminated together using conventional lamination processes, for example using suitably high temperature and pressure, to produce the final laminated glazing pane 81.

In the final laminated glazing pane 81 as shown in FIG. 9, the electrical device 60 is between the first and second sheets of adhesive interlayer material 89, 91 and is located in the cut-out region of the third sheet of adhesive interlayer material 93. Such a construction makes lamination simpler as the extra third ply of adhesive interlayer material (compared to a two-ply adhesive interlayer structure) makes it easier to accommodate the thickness of the electrical device 60 in between the first and second sheets of adhesive interlayer material.

In the final laminated glazing pane 81 the first sheet of adhesive interlayer material 89 is adjacent to and in direct contact with the first sheet of glass 83 and the second sheet of adhesive interlayer material 91 is adjacent to and direct in contact with the second sheet of glass 85. The third sheet of adhesive interlayer material 93 is in direct contact with both the first and second sheets of adhesive interlayer material 89, 91.

FIG. 9 is a schematic cross-sectional representation through the line B-B' in FIG. 8 and illustrates how the portion 72 extends beyond the periphery of the laminated glazing 81 such that electrical power may be supplied to the illumination device 60 via the electrical contacts 68, 69.

At least one of the first, second and third sheets of adhesive interlayer material 89, 91, 93 may be PVB or EVA.

The first sheet of glass 83 has an array of dots on a portion of the major surface thereof facing the first sheet of adhesive interlayer material 89, for example as illustrated in FIGS. 3 and 4. There may be three separate regions each having an array of dots (one for diffusing light from each light emitting diode 65, 66, 67) or there may be one region having an array of dots for diffusing light from all three light emitting diodes 65, 66, 67. There may be two regions each having an array of dots for diffusing light from the light emitting diodes 65, 66 and 67 or 65 and 66, 67 or 66 and 65, 67.

The first sheet of adhesive interlayer material 89 may be translucent to help further diffuse the light emitted from the light emitting diodes 66, 66, 67.

In an embodiment, the first sheet of adhesive interlayer material is configured in a similar way to the third sheet of adhesive interlayer material 93 as illustrated in FIG. 8. That is, the first sheet of adhesive interlayer material may have a cut-out region therein. A sheet of translucent interlayer material may be positioned in the cut-out region, whereas the first sheet of adhesive interlayer material having a cut-out region therein may be a conventional non-translucent adhesive interlayer material such as PVB. A plan view to help illustrate such an embodiment is shown in FIG. 10.

Figure 10:
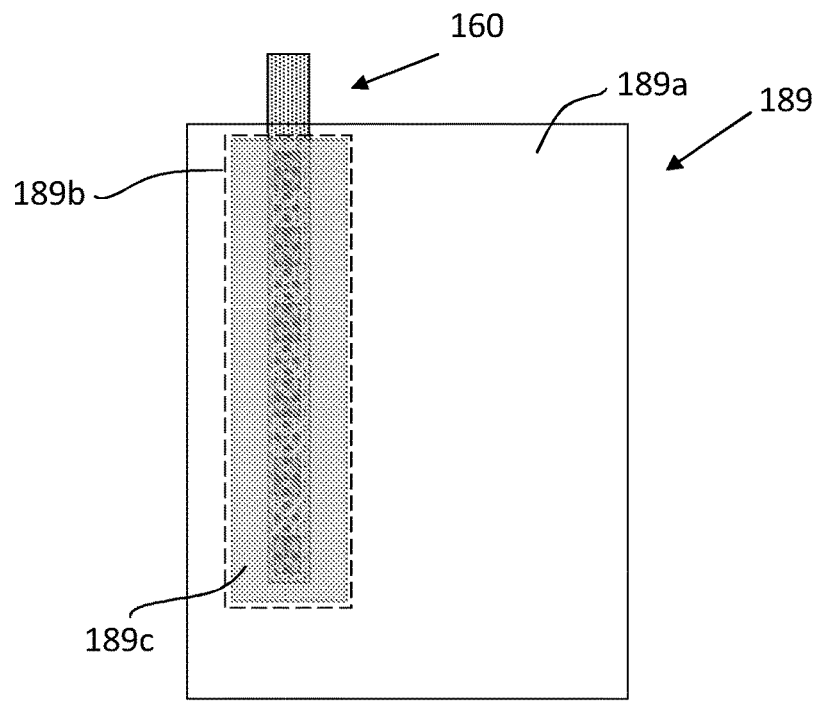
FIG. 10 shows a plan view of a sheet of an adhesive interlayer on an illumination device.

FIG. 10 shows a schematic plan view of a first sheet of adhesive interlayer material 189 that may be used instead of the first sheet of adhesive interlayer material 89 shown in FIGS. 8 and 9.

The first sheet of adhesive interlayer material 189 has a first portion 189a of conventional PVB (i.e. clear PVB) having a cut-out region 189b therein. Located in the cut-out region 189b is a sheet of translucent PVB 189c. The sheet of translucent PVB 189c is coplanar with the first portion 189a.

Positioned below the first sheet of adhesive interlayer material 189 is an illumination device 160 that is similar to the illumination device 60, there being six light emitting diodes on the circuit board instead of only three.

Figure 11:
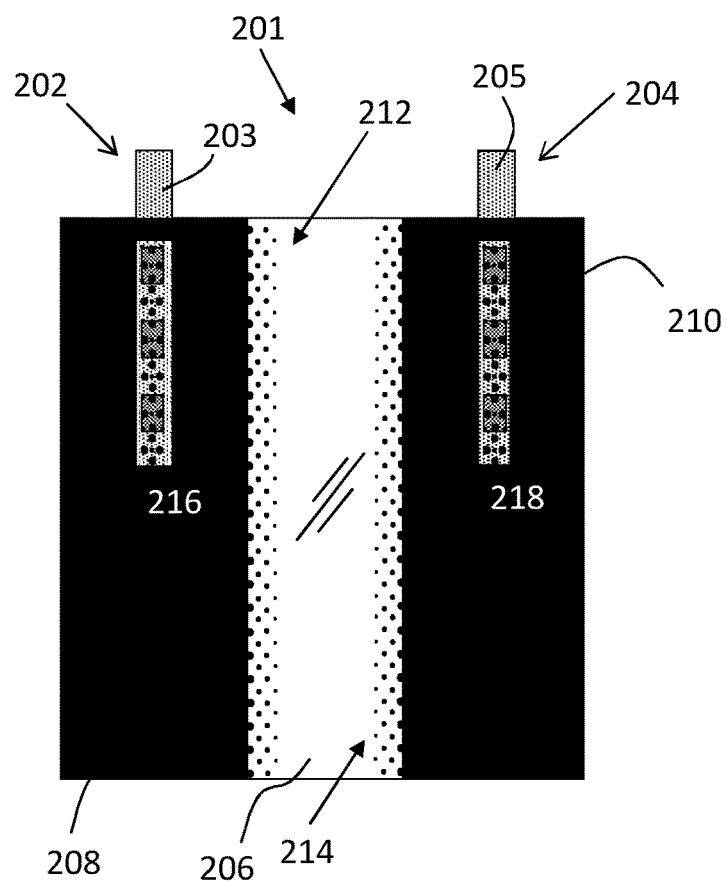
FIG. 11 shows a schematic plan view of another laminated glazing pane in accordance with the present invention.

FIG. 11 shows a schematic plan view of another laminated glazing pane 201 in accordance with the present invention.

The laminated glazing pane 201 is configured in a similar way to the laminated glazing pane 81 shown in FIGS. 8 and 9, except in this embodiment there are two illumination devices 202, 204 between the first and second sheets of glass. Each illumination device 202, 204 is the same as illustrated in FIGS. 5 and 6 and has a respective end portion 203, 205 to allow power to be provided to the light emitting diodes as previously described.

Furthermore, in this embodiment the first sheet of glass 206 has two obscuration regions 208, 210. At the edge of the first obscuration region 208 is a first fade out band 212 and at the edge of the second obscuration region 210 is a second fade out band 214. Between the fade out regions the laminated glazing pane 201 is optically transparent.

The obscuration regions 208, 210 and the fade out regions 212, 214 are screen printed using a conventional screen-printing process. With reference to FIG. 3, major surface 3b has the obscuration regions 208, 210 and the fade out regions 212, 214 printed thereon.

There is an opening 216 in the first obscuration region 208 and a first array of dots is in the opening 216 to diffuse light emitted from the light emitting diodes of the first illumination device 202. There is also an opening 218 in the second obscuration region 210 and a first array of dots is in the opening 218 to diffuse light emitted from the light emitting diodes of the second illumination device 204.

The array of dots in the first and/or second regions 216, 218 may be printed at the same time as the obscuration regions 208, 210 and/or the fade out regions 212, 214, or at some other time, for example after the obscuration regions 208, 210 and/or the fade out regions 212, 214 have been printed.

Although in the previous figures the laminated glazings are shown as being flat (or planar), it is within the scope of the present invention to provide a laminated glazing that is curved in at least one direction. Preferably the radius of curvature in the at least one direction is between 500 mm and 20000 mm, more preferably between 1000 mm and 8000 mm.

In the preceding examples where sheets of glass were described, a suitable glass composition for the glass is a soda-lime-silica glass composition. A typical soda-lime-silica glass composition is (by weight), $SiO_2$ 69-74%; $Al_2O_3$ 0-3%; $Na_2O$ 10-16%; $K_2O$ 0-5%; $MgO$ 0-6%; $CaO$ 5-14%; $SO_3$ 0-2%; $Fe_2O_3$ 0.005-2%. Such a glass may be manufactured using the float process.

Other glass compositions may be used, for example borosilicate glass or alkali aluminosilicate glass.

Furthermore, any or all of the sheets of glass in the preceding examples may be replaced by sheets of other types of glazing material, for example plastic material such as polycarbonate.

The present invention provides particular advantage when a laminated glazing with an illumination function is required. By diffusing the light from an illumination device with an array of dots, the point source like nature of light sources that are part of the illumination device is reduced thereby providing more uniform illumination.

The invention claimed is:

1. A laminated glazing pane comprising:
   a first sheet of glazing material having a first major surface and a second opposing major surface,
   a second sheet of glazing material having a first major surface and a second opposing major surface,
   an interlayer structure joining the first sheet of glazing material to the second sheet of glazing material, the interlayer structure comprising at least one sheet of adhesive interlayer material, and
   an illumination device comprising one or more light source,
   wherein the laminated glazing is configured such that
      the interlayer structure is between the first and second sheets of glazing material;
      the second major surface of the first sheet of glazing material faces the first major surface of the second sheet of glazing material; and
      the illumination device is arranged relative to the first sheet of glazing material to emit light towards the second major surface of the first sheet of glazing material;
   wherein the first and/or second major surface of the first sheet of glazing material has an array of dots thereon, each dot having a size,
   wherein the size of each dot and the spacing thereof in the array of dots is selected to provide a diffusing function to light emitted by the one or more light source by blocking some of the light that is emitted by the illumination device thereby diffusing light emitted by the illumination device that is transmitted through the first sheet of glazing material and out from the first major surface thereof.

2. A laminated glazing pane according to claim 1, wherein 1) the illumination device is mounted to the second major surface of the first sheet of glazing material and the second major surface of the first sheet of glazing material comprises at least one electrically conductive pathway thereon for providing electrical power to the illumination device, or 2) the illumination device is mounted to the first major surface of the second sheet of glazing material and the first major surface of the second sheet of glazing material comprises at least one electrically conductive pathway thereon for providing electrical power to the illumination device.

3. A laminated glazing pane according to claim 1, wherein the illumination device is mounted to the first major surface of the second sheet of glazing material, and wherein the first major surface of the second sheet of glazing material comprises at least one electrically conductive pathway thereon for providing electrical power to the illumination device.

4. A laminated glazing pane according to claim 2, wherein the at least one electrically conductive pathway is an electrically conductive coating.

5. A laminated glazing according to claim 4, wherein the electrically conductive coating is optically transparent, or wherein the electrically conductive coating is optically opaque.

6. A laminated glazing pane according to claim 1, wherein the illumination device comprises a circuit board and at least one of the one or more light source is mounted on the circuit board, further wherein the circuit board is mounted on the second major surface of the first sheet of glazing material, or wherein the circuit board is mounted on the first major surface of the second sheet of glazing material, the circuit board having at least one electrically conductive pathway thereon for providing electrical power to the illumination device.

7. A laminated glazing pane according to claim 6, wherein the interlayer structure comprises a second sheet of adhesive interlayer material, wherein the circuit board is between the first and second sheets of adhesive interlayer material.

8. A laminated glazing pane according to claim 7, wherein the second sheet of adhesive interlayer material is tinted and/or translucent.

9. A laminated glazing pane according to claim 1, wherein the array of dots is over a first portion of the first or second major surface of the first sheet of glazing material, and wherein the first portion is aligned with one of the one or more light source.

10. A laminated glazing pane according to claim 1, wherein each dot in the array of dots has an outer periphery, further wherein the outer periphery of at least one of the dots in the array of dots is circular, ellipsoidal, triangular, a quadrilateral or has more than four sides.

11. A laminated glazing pane according to claim 1, wherein two or more of the dots in the array of dots are the same size.

12. A laminated glazing pane according to claim 1, wherein the array of dots is only on the first major surface of the first sheet of glazing material, or the array of dots is only on the second major surface of the first sheet of glazing material.

13. A laminated glazing pane according to claim 1, wherein the array of dots is only on the second major surface of the first sheet of glazing material.

14. A laminated glazing pane according to claim 1, wherein the array of dots is at least partially surrounded by an optically opaque region, the optically opaque region preventing light from being transmitted through the laminated glazing pane.

15. A laminated glazing pane according to claim 14, wherein the optically opaque region is a printed region on the first and/or second major surface of the first sheet of glazing material.

16. A laminated glazing pane according to claim 1, wherein the first and/or second sheet of glazing material comprises glass.

17. A laminated glazing pane according to claim 1, wherein the first sheet of adhesive interlayer material is tinted and/or translucent.

18. A laminated glazing pane according to claim 1, wherein at least one of the one or more light source is a light emitting diode, and wherein light emitted by the light emitting diode is diffused by the array of dots.

19. A vehicle glazing comprising a laminated glazing pane according to claim 1.

20. A laminated glazing pane according to claim 1, wherein the first sheet of adhesive interlayer material comprises polyvinyl butyral, a copolymer of ethylene, polyurethane, or an ionoplast interlayer material; and/or wherein the first adhesive interlayer has a thickness between 0.2 mm and 2 mm.

* * * * *